May 11, 1937.                C. W. VAN RANST                2,079,724
                                TRANSMISSION
                        Filed Aug. 28, 1934           3 Sheets-Sheet 1
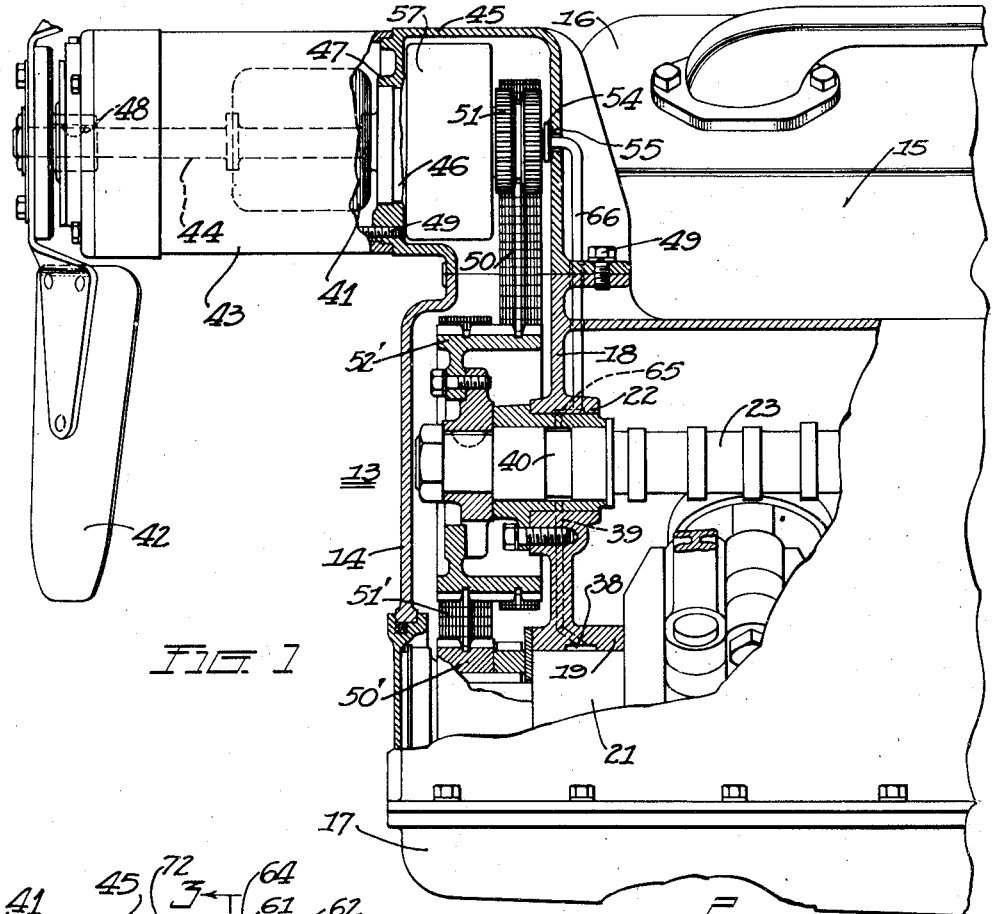
Fig. 1
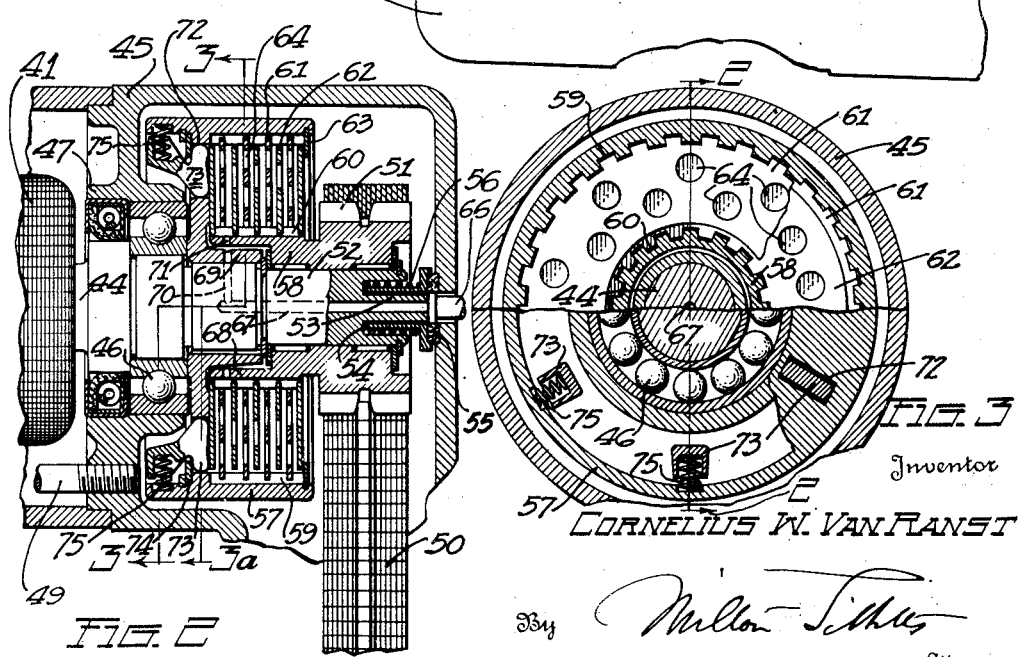
Fig. 2                                                Fig. 3
Inventor
CORNELIUS W. VAN RANST
By Milton Sills
   Attorney

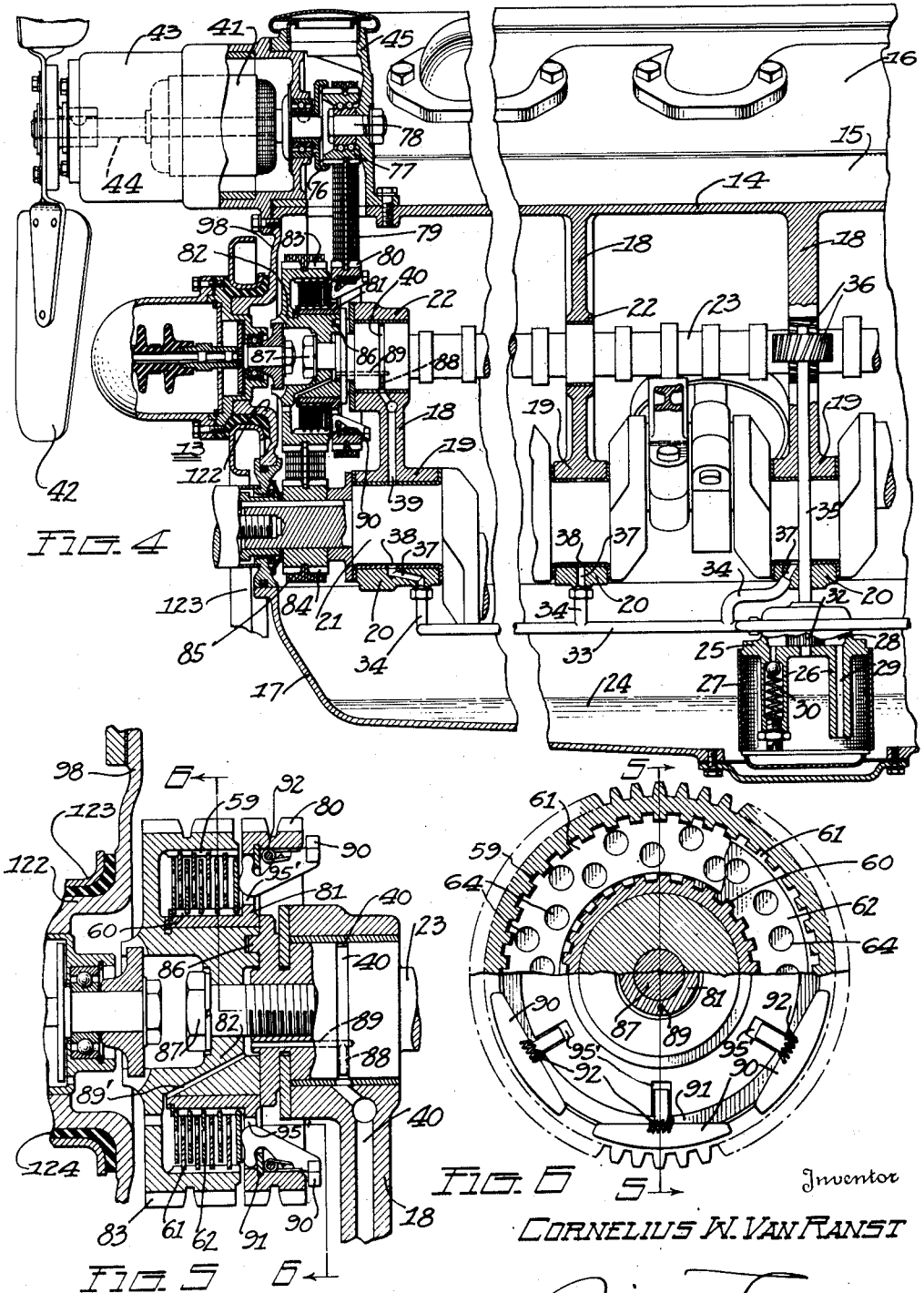

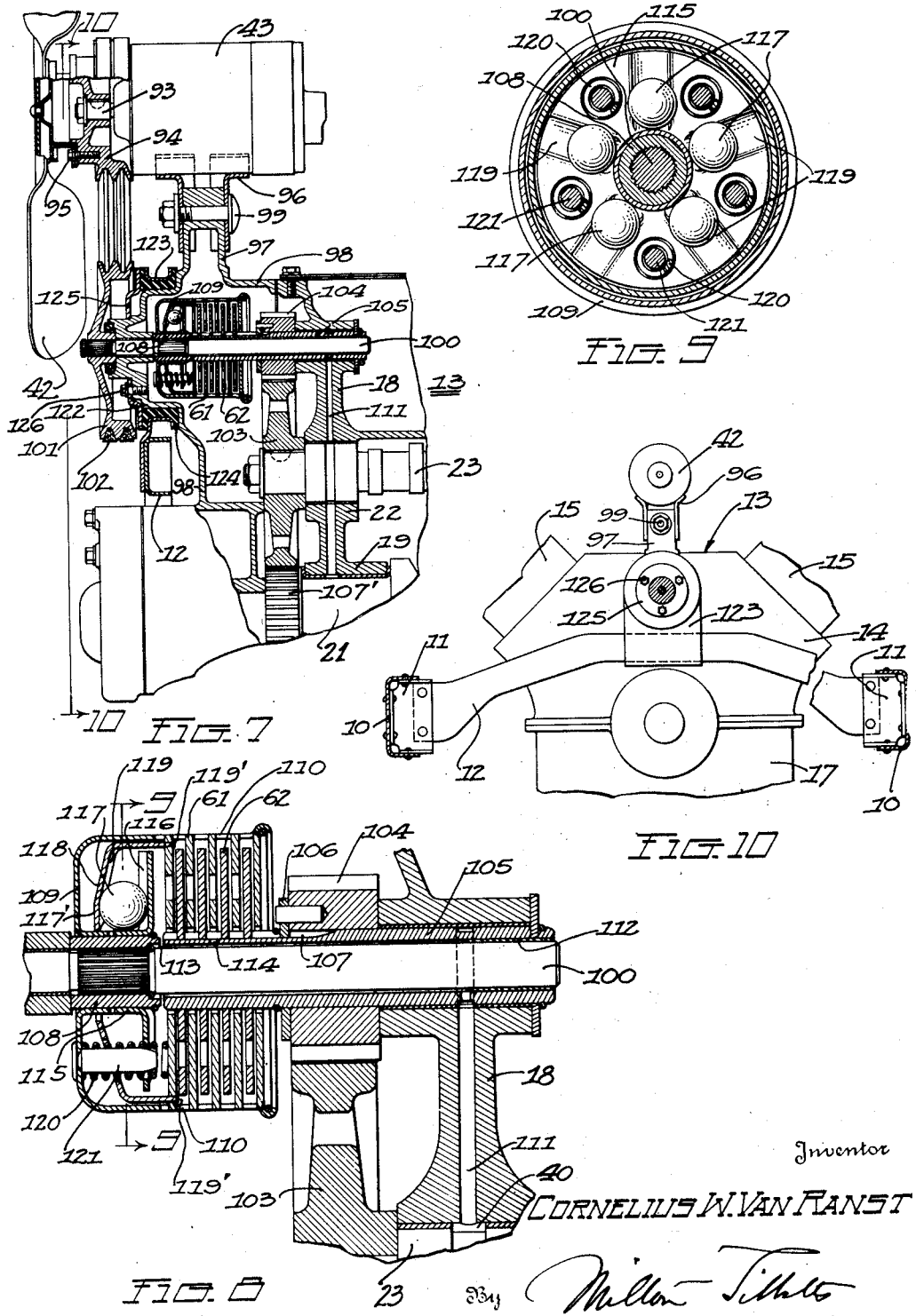

Patented May 11, 1937

2,079,724

UNITED STATES PATENT OFFICE 2,079,724

TRANSMISSION

Cornelius W. Van Ranst, Detroit, Mich., assignor to Packard Motor Car Company, Detroit, Mich., a corporation of Michigan Application August 28, 1934, Serial No. 741,791

5 Claims. (Cl. 192—58)

This invention relates to internal combustion engines and more particularly to driving mechanism for engine accessories.

It is customary to equip motor vehicle engines with a fluid cooling system having a radiator and a fan, driven from the engine, for moving air in contact with the radiator to take up heat from the fluid passing therethrough. The fan speed varies in accordance with the engine speed and consequently the load imposed upon the engine to drive the fan varies in accordance with engine speed as likewise does the noise made by the fan. Since the motor vehicle industry has become noise conscious, the transmission mechanism and engine noises have been reduced to an extent that the fan noise, previously unnoticed, is now objectionable particularly above an average speed of engine operation.

There is also associated with a motor vehicle engine a generator which is driven directly therefrom. The load imposed upon the engine for driving the generator also varies in accordance with engine speed and it is customary for the generator to reach its peak output somewhere below highest engine speed. When the engine is operating in its highest speed range, the generator output is below peak and the load imposed upon the engine to operate the generator is high. Due to the generator R. P. M. developed when the engine is operating at high speeds, sufficient heat is often generated to liquefy some of the lead filling in the generator to an extent that it will be thrown out of place by centrifugal force and this condition is of course objectionable as it materially decreases the life of the generator.

It is an object of the invention to reduce engine noise by providing an engine operated drive mechanism which will rotate an engine accessory at a constant speed when the engine speed is above a predetermined R. P. M.

Another object of the invention is to increase the life of an engine accessory and the load on the engine required for driving it through the provision of driving mechanism which is operated directly from the engine but limited as to maximum speed transmitted.

Another object of the invention is to provide a single driving means from the engine to a fan and a generator which imparts rotation in accordance with engine speed below a predetermined engine R. P. M. and which imparts a constant speed of rotation when the engine speed is above the predetermined R. P. M.

A further object of the invention is to provide an accessory driving mechanism for engines in which the engine lubricant forms a part of a clutch connection.

Still another object of the invention is to provide a new and improved form of driving means for an engine accessory.

Other objects of the invention will appear from the following description taken in connection with the drawings, which form a part of this specification and in which:

Fig. 1 is a side elevational view, partly broken away and partly in section, of one end of an internal combustion engine having my invention incorporated therewith;

Fig. 2 is a sectional view of the same taken on line 2—2 of Fig. 3;

Fig. 3 is a sectional view taken on line 3—3, 3—3a of Fig. 2;

Fig. 4 is a vertical sectional view of one end of an engine, similar to that shown in Fig. 1, illustrating a modified form of drive mechanism for the generator and fan and further details of the lubricating system;

Fig. 5 is a sectional view taken on line 5—5 of Fig. 6;

Fig. 6 is a sectional view taken on line 6—6 of Fig. 5;

Fig. 7 is another vertical sectional view of an end of the engine illustrating another modified form of drive for the generator and fan;

Fig. 8 is an enlarged sectional view of a portion of the drive mechanism including the clutch shown in Fig. 7;

Fig. 9 is a sectional view taken on line 9—9 of Fig. 8;

Fig. 10 is a sectional view taken substantially on line 10—10 of Fig. 7;

Referring now to the drawings by characters of reference, 10 indicates the side sills of a motor vehicle main frame having brackets 11 secured to the forward portion thereof, see Fig. 10. Extending transversely of the frame and secured at its ends to the brackets is a cross frame member 12 which also serves as a support for the forward end of an internal combustion engine indicated generally at 13.

The engine illustrated is comprised of a crank case 14 which carries cylinder blocks 15 arranged in V-relation upon each of which a head block 16 is secured. The bottom of the crank case is closed by the usual pan 17. Within the crank case extend webs, as indicated at 18, having bearing portions 19 with which cap members 20 are associated to secure the crankshaft 21 in position. These webs are also provided with bearing portions, as indicated at 22, which receive and support a cam shaft 23.

As illustrated, the engine is provided with a pressure type of lubricating system substantially enclosed by the crank case and pan. The pan serves as a sump for containing a body of oil, as indicated at 24, and the pump structure consists of a housing 25 having extensions 26 which project into the body of oil. Surrounding these extensions is a screen 27 through which oil must pass before entering the pump chamber 28. Through one of the extensions 26 extends an inlet passage 29 which communicates with the pump chamber 28. The other extension 26 forms a closed chamber 30 having a spring pressed ball therein, this chamber serving as a pressure relief means for the pump chamber. In the chamber 28 are arranged gears 32 which form the means for drawing oil from the sump into the chamber 28 through the passage 29 and they also serve to move the oil under pressure through the main feeding manifold 33 and the branches 34 leading therefrom. One of the gears is driven by a shaft 35 which extends into the crank case and is rotated by means of gearing, as indicated at 36, driven from the cam shaft in the usual manner. The manifold branches illustrated are connected with passages 37 in the main crankshaft bearings and such passages communicate with grooves 38 which encircle the crankshaft bearings. The forward web 18 is provided with a passage 39 which communicates with the forward annular groove 38 for conducting oil to an annular groove 40 in the periphery of the forward bearing of the cam shaft.

At the forward end of the crank case and projecting from the upper wall thereof, intermediate the two banks of cylinders, is arranged a structure consisting of a generator 41 and a fan 42. The conventional housing 43 surrounds the generator and a shaft 44 extends through the generator and projects forwardly of the generator housing and is connected to drive the fan 42. Between this generator and fan shaft and an engine rotated element, such as the cam shaft or an extension thereof, is arranged driving mechanism including a clutch which is of a type such that the shaft can be driven at a relatively high speed when the engine is operating in its lower speed range and which will drive the shaft at a desired maximum speed limit irrespective of the speed of the engine above a given R. P. M. This driving mechanism is shown in three modified forms and I will now describe each form separately.

In Figs. 1 to 3 inclusive, there is a bracket 45 having a circular flanged forward end telescoped by the generator housing. The shaft 44 extends through the housing and is carried by suitable bearings, one of which is shown at 46 mounted in a hub 47 formed in the front wall of the bracket. The fan hub is keyed to the forward end of the shaft 44, as indicated at 48, so that it will rotate therewith. The bracket is secured to the crank case by bolts, as indicated at 49, and there is an aligned opening in the top of the crank case and the bottom of the bracket through which a chain 50 extends. This chain engages a gear 51 loosely mounted upon the rear end 52 of the shaft 44 and a gear 52' keyed to the front end of the cam shaft. A chain belt 51' driven by a gear 50' on the crankshaft drives the gear 52'. The rear shaft end 52 is formed with a reduced end 53 which is encircled by a sleeve 54 pressed against a bushing 55, in leak-proof relation, by a coil spring 56.

Between the loosely mounted gear 51 and the shaft 44 is provided clutch means adapted to be controlled automatically and preferably by the speed of the engine so that there will be a continuous driving of the shaft 44 while the engine is operating but at a limited maximum rate of speed while the engine is operating in its upper speed range. As illustrated in the various modifications, this clutch is generally similar and is controlled preferably by means responsive to centrifugal force.

Keyed to the end 52 of the shaft is a clutch hub 57 and formed on the front end of the gear 51 is a clutch hub 58. The hub 57 is formed with internal longitudinally extending grooves 59 while the hub 58 is formed with peripheral grooves 60 extending in an axial direction. These grooved portions of the hubs are in telescopic spaced relation and perforated clutch discs 61 and 62, arranged in alternating relation, are associated therewith. The discs 61 are formed with tongues which extend into the slots 59 and the discs 62 are formed with tongues which extend into the slots 60. Axial displacement of the discs is prevented by the front wall of the hub 57 and a split ring retainer 63 in the rear end of the hub 57. As indicated in Fig. 3, these clutch discs are formed with perforations 64.

Communicating with the front groove 40 in the cam shaft is a passage 65 with which communicates a conduit 66. This conduit extends through the rear wall of bracket 45 and is arranged to communicate with an axially extending passage 67 in the end 52 of the shaft 44. The hub 58 is formed with a flange 68 which is spaced from and overlies the flange 69 of the clutch hub member 57 and a passage 70 leads from the passage 67 to the space between such clutch hub flanges. Oil from the lubricating system is moved from the crank case sump by the pump 32 through the manifold 33 and around the front crankshaft bearing from which it flows around the front cam shaft bearing through the conduit 66 and the passages 67 and 70 where it can pass around the end of the flange 68 into the grooves 59 and 60. The fluid can thus enter between the discs 61 and 62 and, if desired, openings 71 can be formed in the flange 68 so that the lubricant can move directly between the discs without flowing around the end of the flange 68.

The presence of oil under pressure between the perforated discs 61 and 62 will serve as a driving medium therebetween so that the hub 57 will be driven by the hub 58. The presence of fluid between the discs serves as a lubricant which prevents scoring, if the discs are moved in close proximity to each other, it serves to absorb and transfer heat from the clutch and it serves as a driving medium. Due to the perforations in the clutch discs, relative movement creates a shearing action upon the oil through means of which the drive is transmitted between the driving and driven hubs. Lubricant is free to flow axially of the clutch and, upon flowing from the rear clutch plate, it is free to fall into the crank case where it again becomes a part of the body of oil 24.

This form of fluid drive will normally rotate the shaft 44 substantially in accordance with engine R. P. M. and, in order to control the speed at which the shaft 44 is driven so that it does not increase in proportion to the increase in engine speed in the higher range of operation, I provide means which will automatically regulate the clutch to reduce the speed at which the shaft 44 is driven. This means consists preferably of speed operated means for regulating the distance between the clutch discs.

As shown in Figs. 1 to 3, the front face of the clutch hub 57 is formed with openings 72 in which the bearing ends of weight members 73 are mounted and retained by a ring 74 held against the front wall of the clutch hub 57. Intermediate these weight members 73 and the peripheral flange of the clutch member 57 are coil springs 75 which normally function to move the weight members 73 so that they exert a force rearwardly against the front disc plate and thereby maintain a minimum spaced relation between the discs. When the driven clutch hub 57 is rotated above a predetermined speed, then the weight members 73 will rock outwardly so that the portion engaging the front clutch disc will move toward the left, as viewed in Fig. 2. This movement of the weight members will allow the oil to increase the space between the clutch discs so that there will be less shearing of the fluid thereby allowing a certain amount of relative movement between the driven clutch hub 57 and the driving clutch hub 58. The spring and weight arrangement is such that the hub 57 will be driven at a constant maximum speed when the hub 58 is rotating above a predetermined speed.

In this manner, the generator shaft and fan will rotate at a predetermined constant maximum speed when the engine is operating in its higher range of speed. In other words, the clutch regulating means allows a reduction in the driving speed transmitted to the shaft 44 when the driving mechanism is operated above a predetermined R. P. M. Due to this reduced speed of operation, the fan noise will be less appreciable and the rotating generator parts will run cooler and the life of both the fan and generator will be materially increased as compared with their life in case their rotating parts are driven at a speed varying in accordance with engine speed. With this type of drive, the generator will maintain a peak output above a given engine speed and, as the maximum generator speed is relatively low, the drive mechanism can be geared up so that there will be faster rotation at low engine speeds. Under such circumstances, generator torque for motor vehicles can be materially reduced.

In Figs. 4 to 6 inclusive, the driving mechanism is arranged differently from that shown in Figs. 1 to 3 inclusive but the general principles of operation are the same. In this form of drive mechanism, the shaft 44 has fixed to its rear end an internal gear 76 which meshes with a gear 77 mounted on a stub shaft 78 carried by the rear wall of the bracket 45. A silent type of chain 79 is associated with the gear 77 and extends into the crank case and engages a driven gear 80 forming a part of the driven clutch hub 81. A driving clutch hub 82 extends coaxial with the driven hub and is formed with a gear 83 which is driven from a gear 84 fixed on the crankshaft by means of a silent chain belt 85. The perforated clutch discs 61 and 62 engage the driving and driven clutch hubs in the same manner as set forth in the first described embodiment of the invention. The driving clutch hub is secured rotatably with the front end of the cam shaft through means of bosses 86 and it is secured axially on the end of the cam shaft by means of a bolt 87.

In this modified form of the invention, the cam shaft is formed with a radially extending passage 88 which communicates with the circular groove 40 in the front bearing of the cam shaft. An axially extending passage 89 leads from the groove 40 and communicates with a passage 89' in the driven clutch hub. Lubricant under pressure will flow through passage 88 to the groove 40 and then through passages 89 and 89' to the front end of the driven clutch hub from which it flows rearwardly through the slots 59 and 60 and the perforations in the disc plates. In this instance, as in the first described embodiment of the invention, the lubricant can flow axially through the clutch and it will fall into the crank case where it will be taken up again by the body of oil in the crank case pan.

Means responsive to speed is associated with the clutch in this second embodiment of the invention for the same purpose as that employed with the clutch in the first described embodiment of the invention, the form of speed operated clutch regulating means being of a slightly different form than that previously described. In this instance, weight members 90 are pivotally mounted on the driven hub by a ring 91 and extend through openings 95'. Springs 92 are fixed to the driven hub and engage the weight members to normally press the rear clutch disc toward the front so that the spaces between the discs are a minimum distance apart. Under such circumstances, there will be substantially no reduction in the drive transmitted from the driving clutch hub to the driven clutch hub. When the speed is such that centrifugal force will move the weight members on their pivot against the action of the springs, then the weight members will move rearwardly and allow the fluid to increase the distance between the clutch discs so that there will be a reduction or lost motion effect in the drive transmitted from the driving clutch hub to the driven clutch hub. This form of control means varies from that described in connection with the first embodiment of the invention mainly in the form of the springs and the arrangement of the weight members. In the first instance, the springs are of the coil spring type whereas, in this instance, the springs are of the rat trap type.

In the modification shown in Figs. 7 to 10 inclusive, I have shown still another form of drive mechanism between the fan and generator shaft and the cam shaft. In this instance, the shaft comprises a generator shaft 93 to the forward end of which is fixed a pulley 94 having the fan 42 secured thereto by bolts 95. The generator in this instance is carried by a bracket 96 which is fixed to an upstanding boss 97 on the front crank case cover plate 98 by means of a bolt 99.

Rotatably mounted in the front cover plate and the front web 18 of the crank case is a shaft 100 having a pulley 101 splined to the forward end thereof extending exteriorly of the front crank case cover plate. Belt means, as indicated at 102, serves to drive the pulley 94 from the pulley 101. On the end of the cam shaft is keyed a gear 103 which meshes with a gear 104 fixed to a sleeve 105 by suitable key means 106 engaging in axially extending grooves 107 on the sleeve. The gear 103 meshes with gear 107' fixed on the forward end of the crankshaft.

Between the gear 104 and the pulley 101 is arranged a driving mechanism which includes a fluid disc clutch of the type previously described. A sleeve 108 is fixed to rotate with the shaft 100 and secured on this sleeve is fixed a driven clutch hub consisting of an outer section 109 which telescopes the forward end of the sleeve 105 and an inner section 115. The perforated discs 62 engage in the grooves 107 and the perforated discs 61 engage in slots 110 formed to extend in an axial direction in the driven hub member. Lubricant under pressure is forced through the passage 111 in the front web 18 and flows axially along the periphery of the shaft 100 toward the forward end thereof, there being a space between the sleeve 105 and the shaft 101 forwardly of the bushing 112. This space is in communication with the space occupied by the discs through opening 113 between the forward end of the sleeve 105 and the rear end of the sleeve 108 and, if desired, holes as indicated at 114 can be provided through the sleeve 105 so that the passage of oil between the discs will be more direct. In this instance, the discs are perforated as in the other two modifications and the oil will flow axially through the clutch from which it will leave the rear disc plate and fall into the body of oil in the crank case.

With this third modification of driving mechanism, I provide speed controlled mechanism for regulating the space between the clutch plates which is a different form than the previously described structures. In this instance, the inner hub section 115 mounted on the sleeve 108 has a plurality of depressions forming radially extending runways 116 which receive balls 117. Intermediate these balls and the front wall of the driven outer clutch hub section 109 is a control member 117' having a radially extending angular wall 118 formed with radially extending runways 119 in which the balls are engageable and with rearwardly extending fingers 119' which extend through slots in the front clutch disc plate and have their ends upset. Coil springs 120 are seated against the front clutch disc plate and the hub 109 and are maintained in position by guide pins 121 fixed to the hub 109. These springs normally urge the front clutch disc rearwardly so that the spaces between the clutch plates are maintained a minimum distance apart. As the speed of the driving member increases to a point where the springs 120 will be overcome by force developed by movement of the balls outwardly through centrifugal force, then the control member 117' will be moved forwardly carrying with it the front disc of the clutch so that fluid pressure can increase the spaces between the clutch discs and the rotation transmitted to the driven clutch hub by the sleeve 105 will be at a reduced rate of speed. Due to the angular disposition of the runways 118, the balls will move toward the periphery of the driven clutch hub as the speed increases thus moving the front disc plate therewith and thus allowing the space between the clutch discs to be increased, such arrangement maintaining constant maximum speed of the driven clutch hub when the driving clutch hub is operating above a predetermined R. P. M.

The front cover plate 98 is formed with a boss 122 surrounding the clutch which is telescoped by a bracket 123 and a rubber ring bushing 124 is arranged therebetween. The bracket 123 is fixed to the front cross member 12 and this mounting serves as the front support for the engine. A suitable shield 125 is fixed by bolts 126 to the boss and serves the purpose of enclosing the forward end of the rubber bushing 124.

With the constructions herein described, the life of the generator and the fan is materially increased due to the limitation of the speed at which they are driven with respect to the engine speed. In addition, this lowering of the maximum speed of the generator shaft rotation permits its lower speed range to be stepped up beyond that now employed. Fan noise, due to the speed reduction of the drive at high engine speed, is materially reduced.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In an engine, the combination of an accessory drive mechanism including a clutch having relatively movable telescoping hubs and perforated clutch discs arranged in parallel relation, every other disc being fixed to rotate with one of the telescoping hubs and the other discs being fixed to rotate with the other hub, an engine lubricating system, and means for supplying the space occupied by said discs with oil from said lubricating system.

2. In an engine having a pressure lubricating system, the combination of an accessory drive mechanism including a fluid disc clutch, means for feeding oil under pressure from said lubricating system between the discs of said clutch, and means effective above a predetermined engine speed for regulating the spacing of the clutch discs to maintain a constant maximum speed of the drive transmitted to the accessory.

3. In an engine, the combination of an accessory drive mechanism having a clutch therein composed of a series of relatively movable perforated discs, a pressure lubricating system for the engine bearings, means for by-passing a portion of the fluid from the lubricating system through the perforated discs to provide a driving connection between adjacent disc means, and means responsive to engine speed for regulating the spacing of said discs above a predetermined speed of the engine.

4. In an engine, the combination of a driving element, a driven member, perforated clutch discs mounted to rotate with said driving element, perforated discs intermediate said first mentioned discs mounted to rotate with said driven element, a pressure fluid system connected to move fluid in an axial direction through the perforations in said discs, said discs on said driven shaft being driven by their shearing action on the fluid flowing through the perforations therein, and speed controlled means for regulating the spacing between the discs above a predetermined engine speed.

5. In an engine, the combination of a lubricating system, an accessory drive mechanism having a multiple plate clutch therein, means for by-passing lubricant from the system through the clutch to provide a driving connection, and speed responsive means for initiating spacing of said plates above a predetermined engine speed to maintain a constant accessory driving speed.

CORNELIUS W. VAN RANST.